(12) United States Patent
Dillaway (10) Patent No.: US 7,545,931 B2
(45) Date of Patent: Jun. 9, 2009

(54) PROTECTION OF APPLICATION SECRETS

(75) Inventor: Blair B. Dillaway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/120,494

(22) Filed: Apr. 12, 2002

(65) Prior Publication Data

US 2003/0194085 A1 Oct. 16, 2003

(51) Int. Cl.
*H04L 9/14* (2006.01)
(52) U.S. Cl. ........................................................ 380/44
(58) Field of Classification Search .................. 726/21; 380/44–47; 713/193
See application file for complete search history.

(56) References Cited

U.S. PATENT DOCUMENTS

| 6,044,155 | A  | * | 3/2000  | Thomlinson et al. | 713/155 |
| 6,044,388 | A  | * | 3/2000  | DeBellis et al. | 708/254 |
| 6,330,670 | B1 | * | 12/2001 | England et al. | 713/2 |
| 6,658,567 | B1 | * | 12/2003 | Barton et al. | 713/193 |
| 6,694,434 | B1 | * | 2/2004  | McGee et al. | 713/189 |
| 6,760,441 | B1 | * | 7/2004  | Ellison et al. | 380/45 |
| 7,152,165 | B1 | * | 12/2006 | Maheshwari et al. | 713/193 |
| 2002/0172359 | A1 | * | 11/2002 | Saarinen | 380/46 |

OTHER PUBLICATIONS

"ATIS Telecom Glossary 2000, T1.523-2001", Feb. 28, 2001, pp. 1, obtained from http://www.atis.org/tg2k/_initialization_vector. html.*
Pratschner, "Simplifying Deployment and Solving DLL Hell with the .NET Framework", Sep. 2000, pp. 1-12, obtained from http://www.coldrooster.com/favsample/NETdll.asp.*
Schneier, Bruce, "Applied Cryptography, Second Edition", 1996, pp. 194, 294-295, and 436-445.*
Alvestrand, H., "Tags for Identification of Languages", RFC 1766, Mar. 1995, pp. 1-9.*
Daemen et al., "AES Proposal: Rijndael", Mar. 9, 1999, pp. 1-45.*
Microsoft Corporation, ".NET Framework Tools: Strong Name Tool (Sn.exe)", printed from http://msdn.microsoft.com/library/en-us/cptools/html/cpgrfstrongnameutilitysnexe.asp on Apr. 1, 2002, 3 pages.

(Continued)

*Primary Examiner*—Emmanuel L Moise
*Assistant Examiner*—Jeffrey D Popham
(74) *Attorney, Agent, or Firm*—Birch, Stewart, Kolasch & Birch, LLP (57) ABSTRACT

A method and system for securely storing, managing, and sending critical application data (application secrets) are disclosed. The invention provides an application program interface (API) through which applications (code components) can request a secure store component (SSC) store an application secret, retrieve an application secret, and send an application secret from one code component to another. The SSC encrypts and stores the application secrets using a symmetric cipher algorithm with a key derived by combining machine-specific entropy and evidence associated with the application (or code component), using a mechanism such as a hashing function. When an application requests the SSC to return a stored application secret, the SSC decrypts the secret using a key derived from machine-specific entropy and evidence associated with the application requesting the secret. A secret owning application can also request the SSC to create an object storing the encrypted secret, evidence associated with an intended recipient, and evidence associated with the owning application, in order to send the application secret to another code component.

32 Claims, 5 Drawing Sheets

OTHER PUBLICATIONS

Microsoft Corporation, "How to: Create an Assembly with a Strong Name in .NET Framework SDK", printed from http://support.microsoft.com/directory/article.asp?ID=kb;en-us;Q302340&SD=MSDN on Apr. 1, 2002, 2 pages.

Microsoft Corporation, "Authenticode", printed from http://msdn.microsoft.com/workshop/security/authcode/authenticode_node_entry.asp on Apr. 1, 2002, 1 page.

C. Blundo et al., "Generalized Beimel-Chor Schemes for Broadcast Encryption and Interactive Key Distribution", Theoretical Computer Science, vol. 200, pp. 313-334, 1998.

Siaw-Lynn Ng and Michael Walker, "On the Composition of Matroids and Ideal Secret Sharing Schemes", Designs, Codes, and Cryptography, vol. 24, pp. 49-67, 2001.

Koji Okada et al., "Analysis on Secret Sharing Schemes with Non-Graphical Access Structures", IEICE Transactions on Fundamentals of Electronics, Communications, and Computer Sciences, vol. E80-A, No. 1, pp. 85-89, Jan. 1997.

Taekyoung Kwon and Jooseok Song, "A Study on the Generalized Key Agreement and Password Authentication Protocol", IEICE Transactions on Communications, vol. E83-B, No. 9, pp. 2044-2050, Sep. 2000.

Carlo Blundo et al., "New Bounds on the Information Rate of Secret Sharing Schemes", IEICE Transactions on Information Theory, vol. 41, No. 2, pp. 549-554, Mar. 1995.

Carl Ellison et al., "Protecting Secret Keys with Personal Entropy", Oct. 28, 1999, 13 pages.

R. Pereira and R. Adams, "RFC 2451: The ESP CBC-Mode Cipher Algorithms", Nov. 1998, 14 pages.

C. Kaufman, "RFC 1507: Distributed Authentication Security Service", §§ 1.2.6, 1.3.6, and 1.3.7, printed from http://www.ietf.org/rfc/rfc1507.txt?number=1507, Sep. 1993, 100 pages.

* cited by examiner

PROTECTION OF APPLICATION SECRETS

FIELD OF THE INVENTION

The invention relates generally to computer systems. More specifically, the invention relates to protecting information critical to an application's functionality by encrypting data based on machine-specific entropy and application-specific evidence, and securely communicating the protected information from one code component to another.

BACKGROUND OF THE INVENTION

The rapid emergence of Internet applications based on multi-tier architectures with componentized code has created a need for heightened computer security. That is, software applications are no longer stored in and executed from a single monolithic file. Instead, applications are created from multiple components, potentially running on multiple machines, and delivered and executed across multiple networks. As computer systems increasingly rely on these distributed system and network architectures, computer software must increasingly protect secrets critical to the application's functionality, including cryptographic keying material, passwords, and message digests (or hashes) used to verify the integrity and authenticity of one piece of computer software to another.

Figure 3:
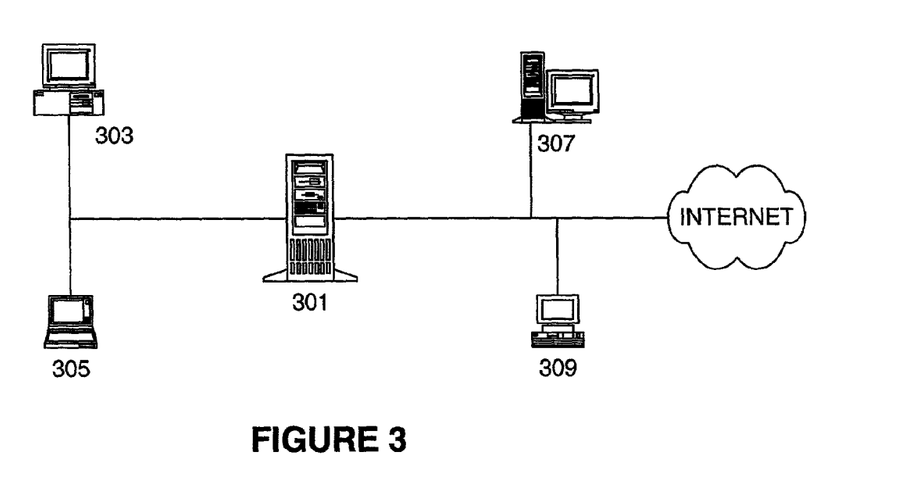
FIG. 3 illustrates a client-server architecture that benefits from the present invention.

For example, with reference to FIG. 3, a server 301 running internet web server software (e.g., Internet Information Server) communicates with local client machines 303-309, each running a web browser (e.g., Microsoft Internet Explorer®). In many cases the client needs to know it is talking with the right web server before providing payment information for an electronic purchase. Typically, this is handled by creating a secure SSL communications channel with server authentication. This creates a problem for the developer of the Internet web server software. SSL authentication requires storage of a private cryptographic key for this purpose, along with a public server X509 certificate. This private key needs to be kept hidden and only made available for use in Internet web service authentication. If a hostile entity can compromise this key, they can impersonate the service and potentially cause significant harm to the clients and to the service owner's business. However, current operating systems and virtual machine environments do not support hiding such secrets such that only a single application can use them. The result is that each application developer must come up with his or her own approach to hiding such secrets or accept a potentially serious risk that must be mitigated using deployment and administrative procedures.

Known solutions to protecting application secrets have focused on protection of persistent data on a per-machine or per-account basis, and isolating runtime information and code at the process level. These solutions typically encrypt an application's secrets using a unique machine key protected by the operating system, or a user-specific key derived from the authentication credentials of each user. In the first case, any application code running on the machine can access the secrets; in the latter any application code running on behalf of the user can access the secrets. If an application has secrets that it truly needs to protect from other application code, it is necessary to implement some private method of hiding such secrets. Approaches that have been used include use of a password derived cryptographic key to encrypt the secrets, scatter-gather algorithms to try and hide such secrets in the application, and use of algorithmic approaches to materializing the secret value when needed. The first method is often impractical as it requires an authorized user be present to enter the password when the secrets are needed. The last approach often results in weak protection as such algorithms are difficult to design and implement in ways that are not trivially attacked.

The difficulty of attacking a secret hiding algorithm is generally determined by the difficulty level of reverse engineering the algorithm used. Design of these algorithms, such that they are not easily reverse engineered, is difficult as the hacker has complete access to the application code. If a hacker can determine how such an algorithm works, then the secrets can be easily retrieved by hostile code. Such code also impacts the application developer in that it requires additional development and debugging time impacting the overall cost in creating the application.

Previous solutions also do not provide a mechanism by which trusted code components can securely share information when they are running inside the same process space with less trusted code components.

Because of the aforementioned difficulties, typically only large developers of high-end services such as Web servers (e.g., IIS), mail servers (e.g., Exchange), or authentication servers (e.g., Kerberos KDC) have been able to expend the resources to develop proprietary solutions based on careful design considerations, after substantial development time, and having undergone rigorous testing to avoid unintentional security breaches. Such solutions are often cost prohibitive for software developers with more modest budgets, causing smaller developers to use less secure methods for protecting application secrets. However, software developers of all sizes require the protection of application secrets to meet their customers' needs.

There are many known examples of solutions used by smaller developers including: storing application secrets (e.g., login/password pairs) as encrypted strings in data files, typically offering minimal security; storing application secrets as clear-text strings in resource or configuration data, which provides virtually no security; and simplistic algorithms that simply write the secret into the application code's data areas at some reserved offset. These known solutions do not provide a general solution that developers can use to manage application secrets with robust security.

Thus, it would be an advancement in the art to be able to more effectively protect critical application secrets in a form that prevents disclosure to potentially hostile code on the same machine, while allowing easy retrieval by the owning application. It would also be an advancement in the art to make such a solution available for arbitrary applications to use through a well-known application program interface (API). It would be a further advancement in the art to be able to protect an application secret when sending the secret to another trusted application, without allowing untrusted applications or malicious code to also access the secret.

BRIEF SUMMARY OF THE INVENTION

Aspects of the invention overcome the problems of the prior art discussed above by using a novel combination of encrypted stores, hidden keys, trusted application evidence, and machine-specific entropy to protect application secrets. A runtime environment may use verifiable runtime information as evidence to authenticate code components, and also use the evidence in combination with the machine specific entropy to derive application specific cryptographic keys used to encrypt and decrypt data. Using application-specific encryption, the invention ensures that only the owning application can retrieve its own stored secrets.

Some aspects of the invention generate a cryptographic key based on machine-specific entropy in combination with trusted evidence associated with a requesting application and, using the generated key, encrypt data received from the requesting application.

Some aspects of the invention generate a cryptographic key based on machine-specific entropy in combination with evidence associated with a requesting application and, using the generated key, attempt to decrypt previously encrypted.

Some aspects of the invention enable communication of application secrets from one code component to another. A secret manager module creates an object that stores evidence associated with an application secret owner that desires to send an application secret to another code component, data encrypted using a key based on machine-specific entropy and trusted evidence associated with the sending application, and evidence associated with an intended recipient code component. The secret manager module returns to the sending application a reference to the newly created object, which the sending application can send to the recipient code component. The recipient code then requests the secret from the secret manager module, passing it a reference to the object. When the requesting code component's evidence matches the intended recipient's evidence, the secret manager module decrypts the data and sends the decrypted data to the receiving code component.

Some aspects of the invention provide a data structure for storing an object used to send an application secret from one code component to another code component. The data structure has a first portion for storing data encrypted using a symmetric cipher algorithm, based on a key generated from machine-specific entropy and trusted evidence associated with the application secret's owner. The data structure has a second portion for storing the trusted evidence associated with the application secret's owner. The data structure has a third portion for storing trusted evidence associated with an intended recipient of the application secret.

Some aspects of the invention provide a computer system that stores and manages application secrets. The computer has in memory one or more code components that execute in a runtime environment, and hidden machine-specific entropy. The computer has a secret store component (SSC) that receives from one of the code components a request to securely store its data, retrieves from an evidence provider trusted evidence associated with the requesting code component, and encrypts the received data based on the evidence and the entropy.

Some aspects of the invention provide an application program interface (API) through which applications can interact with a secret store component (SSC) to securely store and manage application secrets. The API has a first function call for storing application secrets. The first function accepts application data, and encrypts and stores the application data. The encryption is based on machine-specific entropy and evidence corresponding to a code component calling the first function. The API has a second function call for retrieving previously stored application secrets. The second function accepts a reference to previously stored encrypted data, and decrypts previously stored encrypted data corresponding to the reference. The decryption is based on the machine-specific entropy and evidence associated with the requesting code component. The API has a third function call for communicating an application secret from one code component to another code component. The third function accepts a reference to previously stored encrypted data and evidence corresponding to an intended recipient code component. The third function creates a data transfer object including the encrypted secret, the secret owner's evidence, and the intended recipient's evidence, and returns to the requesting code component a reference to the object.

BRIEF DESCRIPTION OF THE DRAWINGS

The foregoing summary, as well as the following detailed description, may be better understood when read in conjunction with the accompanying drawings, in which like reference numerals identify like elements, and which are included by way of example, and not by way of limitation with regard to the claimed invention.

DETAILED DESCRIPTION OF THE INVENTION

Figure 1:
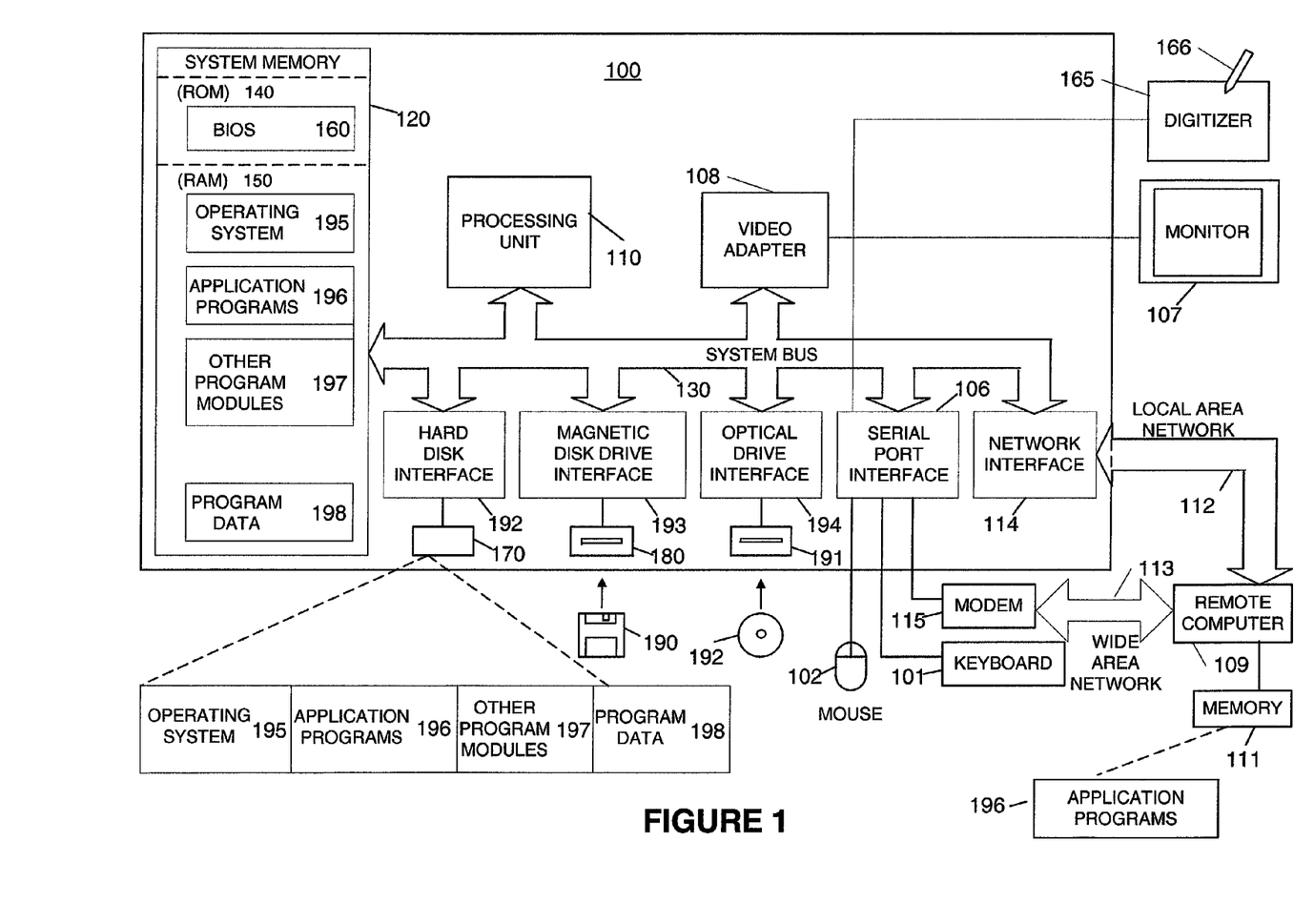
FIG. 1 illustrates a schematic diagram of an exemplary general-purpose digital computing environment that may be used to implement various aspects of the present invention.

Aspects of the present invention use a combination of machine-specific entropy and application-specific evidence to securely manage and communicate critical application information stored in an encrypted data store. One or more aspects of the invention are applicable to any general purpose computing platform capable of running a variety of operating systems, virtual machines; and applications, including PCs running WINDOWS®, LINUX®, MacOS®, or SOLARIS® brand operating systems and the like, as well as PDA devices, Tablet PCs, pen-based computers, and other data processing systems. FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
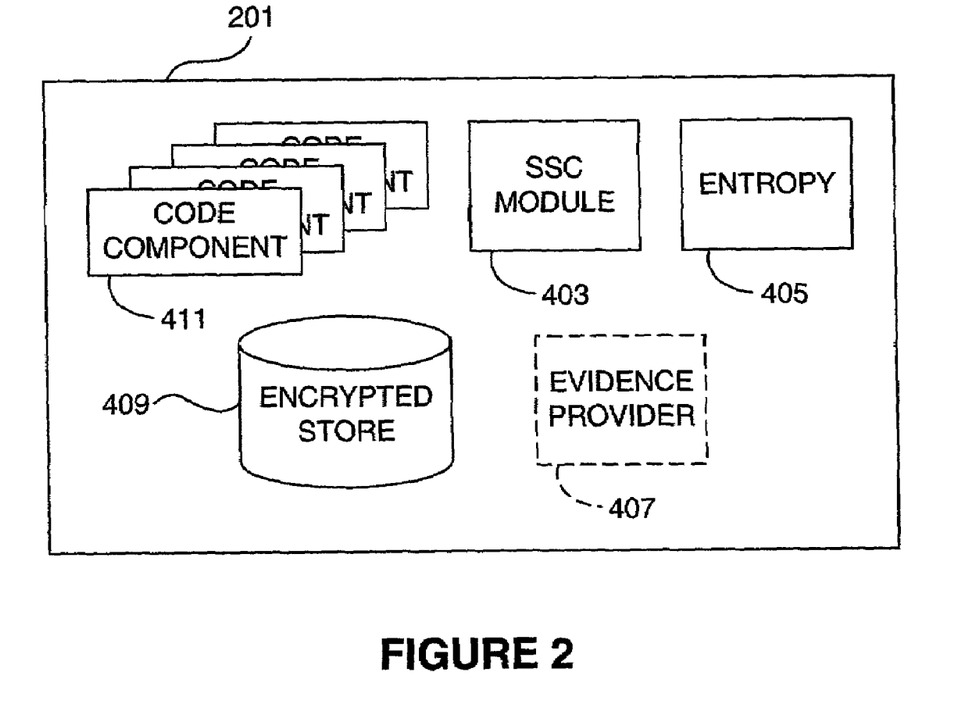
FIG. 2 illustrates a block diagram of a computer readable medium according to one or more aspects of the invention.

With reference to FIG. 2, the inventive methods may be embodied as computer readable instructions stored on a computer readable medium such as a floppy disk, CD-ROM, removable storage device, hard disk, system memory, or other data storage medium. FIG. 2 illustrates a block diagram of a computer readable medium 201 that may be used in accordance with one or more aspects of the invention, further described below. The computer readable medium 201 may store one or more software modules, such as code components 411, SSC module 403, entropy 405, and encrypted data store 409. Evidence provider 407 may also optionally be stored on computer readable medium 201. More or fewer software modules may alternatively be used. For example, entropy 405 may be stored internally in SSC module 403. When one or more computer processors execute one or more of the software modules, the software modules interact to perform according to aspects of the present invention. While the software modules may be stored on the same computer readable medium or on various computer readable mediums used by a common system, the computer system may execute one or more of the software modules in separate process spaces to maintain security, as is known in the art.

Figure 4:
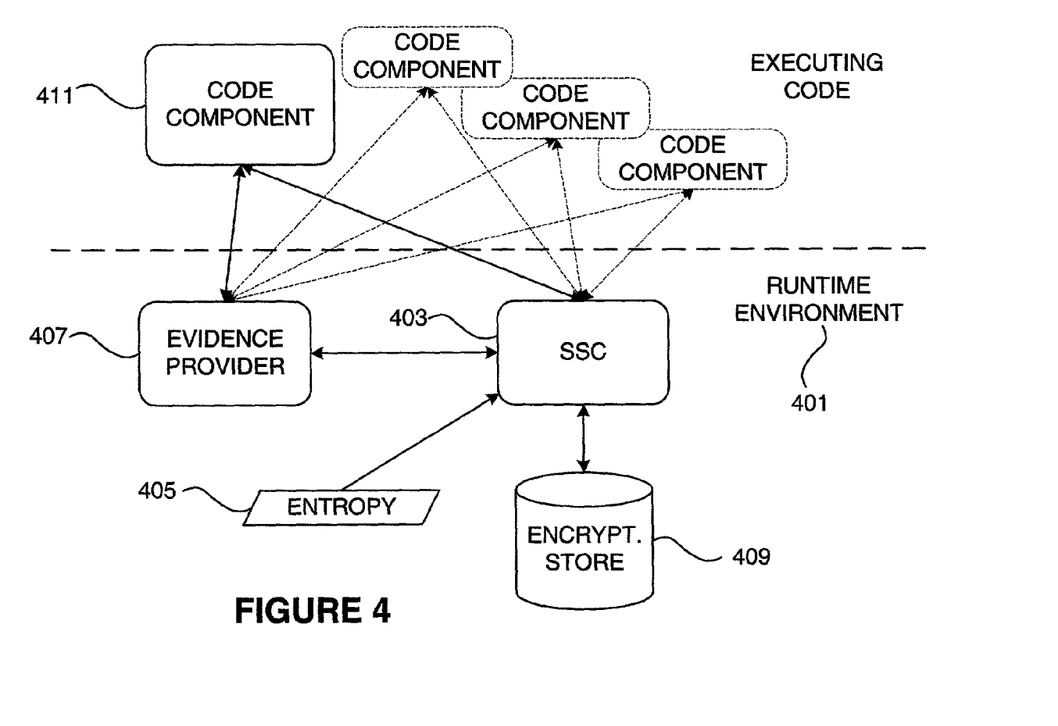
FIG. 4 illustrates a data flow diagram for one or more aspects of the invention.

FIG. 4 illustrates a data flow diagram according to one or more aspects of the invention. Within a runtime environment 401, there is a secret store component (SSC) 403, entropy 405, an evidence provider 407, and an encrypted store 409. One or more code components 411 execute on top of the runtime environment. The terms "code component" and "application" are used interchangeably herein.

Secret store component (SSC) 403 manages application secrets as described herein, and may publish public functions available for code components to call in order to perform one or more services in accordance with various aspects of the invention. For example, SSC 403 may publish a first function StoreSecret ( ) that code components may call in order store one of the code component's secrets, a second function RetrieveSecret ( ) that code components may call in order to retrieve a previously stored secret, and a third function CreateSecretObject ( ) that code components can call in order to create an instance of an object that may be used to securely transfer a secret from one code component to another. Alternatively, SSC 403 may publish more or fewer functions depending on system design criteria and the like. Developers may then use these functions in their development of secure Internet-scale, componentized, distributed applications.

In addition to publishing functions for code components to use, SSC 403 may retrieve trusted code evidence associate with code components requesting SSC services, securely store SSC (or machine-specific) internal entropy data, compute encryption keys unique for each code component by combining trusted code evidence with SSC internal entropy data, encrypt and decrypt secret data using predefined cryptographic algorithms, and provide persistent storage of encrypted secrets.

Entropy 405 may be any data that cannot easily be determined by an attacker and that is specific to an instance of SSC 403. Preferable, entropy 405 includes random binary data specific to the SSC in a given computer environment in order to prevent application secrets stored on one computer from being moved to another computer and decrypted. Entropy may be computed using any high quality random number generator. Reliable random number generators may use a hardware source of randomness if available, or it may use a software random number generator that uses multiple sources of unpredictable events such as a hard disk head position, time between keyboard entries, and so forth. In addition, the entropy is preferably (but not required) larger than the required encryption key size (discussed below).

Each SSC may hide the entropy data so that malicious code cannot locate and exploit the machine-specific entropy. This may be done using any of a variety of approaches discussed previously such as scatter-gather algorithms or embedded algorithmic approaches that materialize the entropy when needed. These can be combined with various code obfuscation techniques such as self-modifying code, partially encrypted code segments, and so forth. The specific technique used to hide the entropy data is not critical, so long as the specific technique used affords a reasonable degree of protection and prevents easy attack by hackers and malicious code.

In one aspect of the invention, the entropy data includes a random number generated using the WINDOWS® CryptoAPI random number generator when the SSC is installed on a machine. By providing machine specific entropy, and hiding the entropy so that it is not available to malicious code, hackers cannot steal the encrypted store, reinstall it on another machine on which a second SSC is installed, and decrypt the stored secrets using the second machine's SSC.

Code components 411 and SSC 403 exchange storage and retrieval requests for secrets stored in encrypted store 409. Code components 411 and evidence provider 407 independently communicate to establish each code component's evidence. Multiple code components using a single shared SSC, evidence provider, and encrypted store increases efficiency and reduces the amount of system resources required to provide a robust security system. However, multiple SSCs, evidence providers, and/or encrypted stores may alternatively be used. Each code component may communicate with the SSC via a published API.

A code component (or application) refers to any compilation of source code, object code, or other code that causes computation to occur. For example, a code component may include an executable program, a dynamic link library, a script file, or any source code file that is executed by the runtime environment. The runtime environment may be an operating system such as WINDOWS®, LINUX®, MacOS® and SOLARIS® brand operating systems, or it may be a virtual machine, such as JAVA® VM and Microsoft Corporation's Common Language Runtime (CLR). Other virtual machines and operating systems may alternatively be used.

Evidence provider 407 provides verifiable evidence for use by SSC 403 and/or code component 411, as further discussed below. Evidence generically refers to any trustworthy information regarding a code component (e.g., file name, file size, digital signature, etc.). Evidence provider 407 is trustworthy code that the SSC relies upon to supply unique information about an application that is requesting its services. Evidence provider is preferably capable of inspecting the in-memory runtime image of such applications and identifying them. In one aspect of the invention, the evidence provider 407 verifies a digital signature over the application code image. The evidence provider examines the currently executing application code memory image, including an embedded digital signature, and verifies the signature. The result is that if the calling code component is malicious code, the trusted evidence will be evidence associated with the malicious code, and not evidence associated with a non-malicious application (e.g., outlook.exe) the malicious code is attempting to impersonate.

In one aspect of the invention, the evidence provider uses Common Language Runtime (CLR) StrongName digital signatures as evidence. StrongNames provide a unique, unspoofable, name for a given CLR code component that also insures that the code has not been modified. The fact that the StrongName is cryptographically bound to the code component using digital signature technology makes the binding particularly strong and verifiable at any given time. Using StrongName-based evidence also provides controlled sharing. For example, one could use only the StrongName public key value as the evidence, resulting in all application code signed with the corresponding private key being treated as the same application by the SSC. Alternatively, by using the full CLR Assembly name including the StrongName public key, user supplied name, version, and locale, very fine grained differentiation between applications is achieved.

In other aspects of the invention, evidence provider 407 may alternatively provide any of various types of evidence, including Authenticode certificates associated with a digital signature over the application, a message digest value over the application code image, or even application name strings provided these are guaranteed to be unique and unspoofable. The specific type of evidence used is secondary to the evidence's level of trustworthiness With further reference to FIG. 5, one or more aspects of the invention provide a method for protecting a code component secret by encrypting the secret using a key based on the code component's evidence, as well as on machine-specific entropy. In step 501, SSC 403 receives a request from code component 411 to store a secret S. The request may optionally include a code component defined reference value, which may be used when a code component stores multiple secrets. The code component may later use the reference value to indicate to the SCC which of the multiple secrets to retrieve, as further described below.

Figures 5, 6:
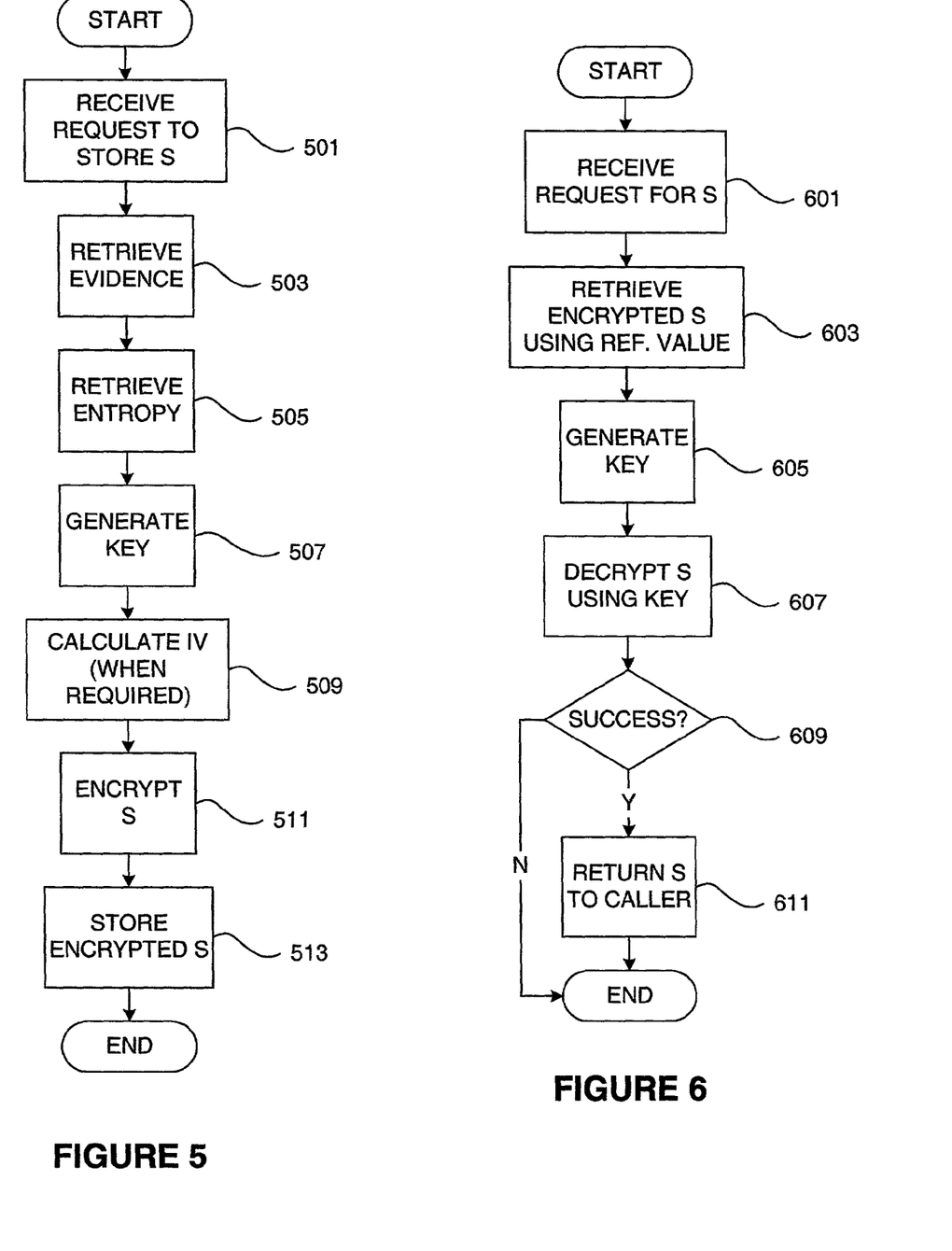
FIG. 5 illustrates a method for protecting application secrets according to one or more aspects of the invention.
FIG. 6 illustrates a method for retrieving protected application secrets according to one or more aspects of the invention.

After receiving the request to store secret S, SSC 403 retrieves, in step 503, the trusted evidence for the requesting code component from evidence provider 407. After receiving the evidence, SSC 403 may convert the evidence into a byte array representation. That is, when the evidence is in the form of a character string, the SSC may convert the character string representation into a byte array representation of the data. In step 505, SSC 407 retrieves the machine-specific entropy byte array. These may be retrieved by running an algorithm within the SSC, or could be materialized on a byte-by-byte basis as required for computation of the key.

In step 507, SSC 403 calculates the cryptographic key K that will be used to encrypt the secret S by combining the evidence with the entropy. In one aspect of the invention, key K may be defined as the first n bits of HASH(Entropy,Evidence), where n is the required key size for the encryption algorithm (step 511, below). Preferably, a non-reversible algorithm such as SHA-1 or MD-5 is used. Knowledge of an application's evidence should not provide useful information as to the key used to protect that application's secrets. If the specific hash function used fails to provide a sufficient number of bits for the desired symmetric encryption key, the SSC may compute additional bits by hashing the results with a known constant, and concatenating the result to the first hash value. Such techniques are well known within the cryptographic community.

Alternatively, non-hash-based approaches may be used. It is only important that an attacker cannot easily determine the encryption key if he or she knows the evidence value. One could, for example, use the entropy value to derive a symmetric encryption key, encrypt the evidence value using this key, and then use n bits of the encrypted value as the secret encryption key. The specific algorithm used is secondary to the use of both the evidence and the entropy in generating the key, so long as the algorithm provides sufficient security against hackers reverse-engineering it.

In step 509, SSC 403 calculates a random initialization vector (IV) when required by the encryption (cipher) algorithm, e.g., when using a block cipher in cipher block chaining (CBC) mode. If the specific encryption algorithm does not use an initialization vector, this step may be skipped.

In step 511, the SSC encrypts S using key K (and the initialization vector, when required). In one aspect of the invention, regular, double, or triple DES encryption may be used as the encryption algorithm. In other aspects of the invention, advanced encryption standard (AES) or RC4 may be used. However, any encryption algorithm may be used that provides a strong symmetric cipher. Finally, in step 513, SCC 403 stores the encrypted secret in persistent data store 409 (e.g., a database or file), along with the initialization vector (when used). When, in step 501, the code component provides a reference value, the reference value may also be stored with the encrypted secret and the initialization vector. The encrypted store may be indexed or sorted using known database and data storage techniques, including using the reference value as an index value.

Using the above method, malicious code cannot circumvent the SSC because the stored secrets are always encrypted, and the malicious code cannot compute the required decryption keys without knowledge of both the per-machine entropy and application-specific evidence values. Even if a piece of malicious code were able to duplicate a piece of evidence, the malicious code would not have all the information necessary to decrypt any secrets, because the malicious code would still need the machine-specific entropy. If the malicious code were able to duplicate the machine specific entropy, the malicious code would only gain access to the secrets stored on that one machine (assuming the attacker could also duplicate the trusted evidence for each code component).

With further reference to FIG. 6, the SSC may use a complementary method to retrieve a stored secret from encrypted data store 409 by creating a symmetric decryption key. Unless the caller is the secret owner, the correct key will not be generated and the retrieval will fail.

Beginning in step 601, the SSC receives a request from a calling code component for a stored secret S. The request may include a reference value when the code component has more than one secret in storage. If the code component only stores one secret at a time, then default data associated with the code component (e.g., filename) may be used as a reference value. Upon receiving the request, the SSC retrieves, in step 603, the data stored in the encrypted data store 409 at the location identified by the reference value.

SSC 403, in step 605, generates a key K based on data associated with the calling code component 411. That is, SSC 403 retrieves the entropy stored in secure memory, retrieves from evidence provider 407 the evidence for the calling code component, and uses the first n bits of HASH(Entropy,Evidence), as it did when creating the original key used to store the secret (step 507, above). Once the key has been generated, the SSC decrypts S using K in step 607.

In step 609, SSC 403 may determine whether the decryption was a success and, if so, return the decrypted secret to the calling code component in step 611. If the decryption was not a success, the SSC may halt the process and return nothing to the calling code component. The SSC might not always be able to determine if the decryption succeeded or not. Determination of decryption success is only possible when the SSC knows something about the structure of the data that was encrypted. The SSC may add a header structure onto each encrypted secret for this purpose, though this is not required. Alternatively (not shown), the SSC may return the decrypted value to the calling code component regardless of whether the decryption was a success or not. By returning the decrypted value regardless of the decryption's success, the calling code component does not learn whether the decryption was a success or not, and thus cannot gain any beneficial information that could speed up brute force attacks.

Figure 7:
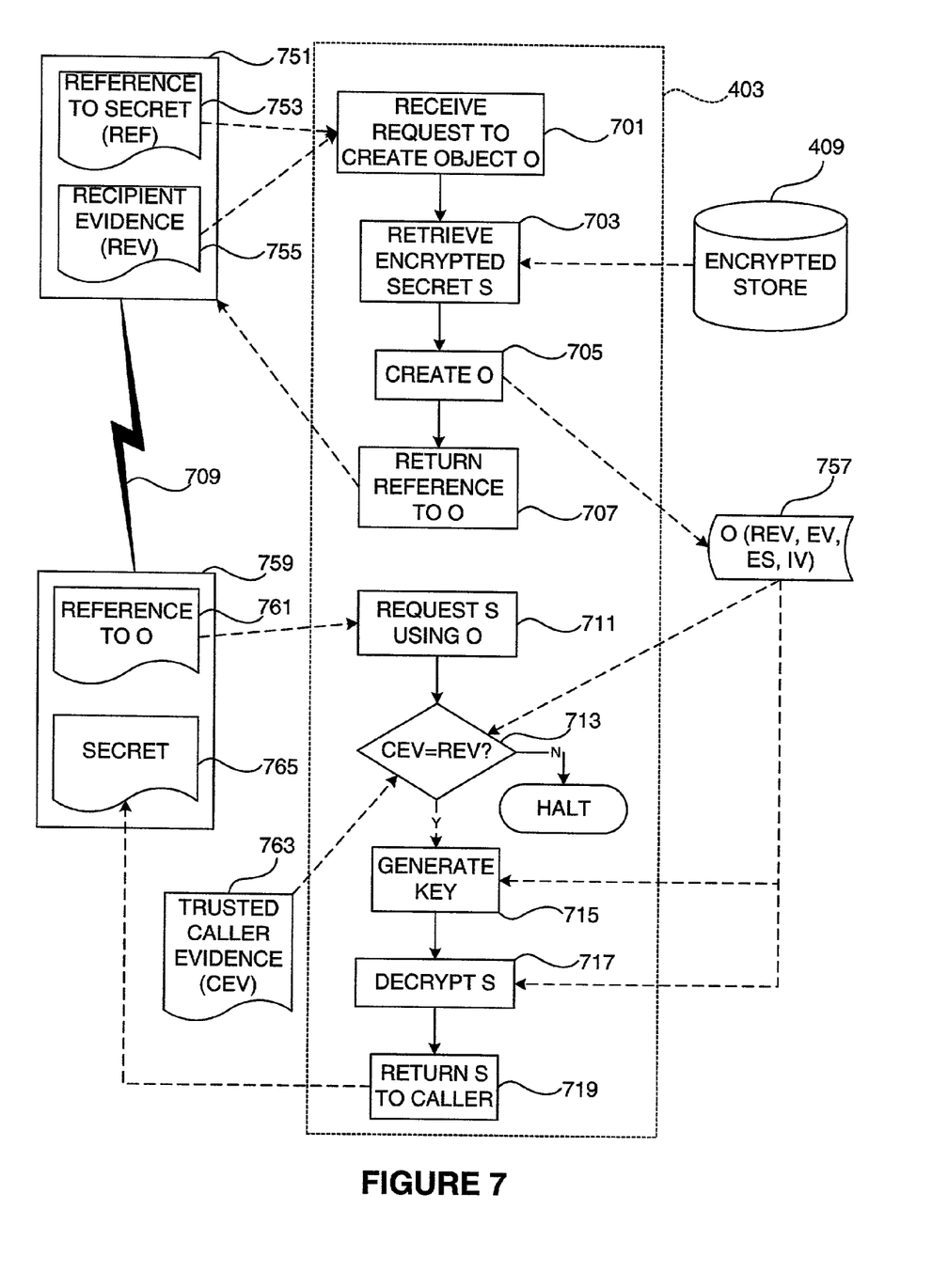
FIG. 7 illustrates a method and data flow for transferring a protected secret from one code component to another according to one or more aspects of the invention.

In another aspect of the invention, with reference to FIG. 7, similar principles may be used to securely pass secrets from one code component to another known, trusted code component. For example, consider an application that makes use of a secure Web service to retrieve stock quotes. Further, the Web service owner only wants to send the stock quotes to its own client application code, which is designed such that the quote data cannot be stored and easily made available to others. To enforce this, an SSL client authentication credential (e.g., an X509 Certificate and corresponding private key) unique to the client application code is generated when the client first registers for the stock quote service. The client application then needs to store this so it is not accessible by other applications. In use (i.e., to receive stock quotes), the client application needs to supply the authentication credential to the SSL protocol handler provided by the operating system. This preferably is done in such a manner that only the SSL protocol handler has access to the credential information, and not other code that may be running in the same process space as the client application.

FIG. 7 illustrates a method performed by SSC 403, with associated data flow, for sending a protected secret from a sending code component 751 to a recipient code component 759 within a runtime environment (e.g., an OS process or a virtual machine environment). In FIG. 7, solid lines indicate control flow (i.e., steps), and dashed lines indicate data flow. The dotted rectangle indicates steps performed by SSC 403.

In step 701, the SSC receives a request from the sending code component 751 to create an object O that securely stores the secret S, and that sending code component 751 can use to communicate the secret to recipient code component 759. The request may include a reference value (REF) 753 that identifies the secret in the encrypted store 409, and should include a copy of recipient evidence (REV) 755 that is associated with the intended recipient code component 759.

In step 703, the SSC retrieves the encrypted secret (ES) from encrypted data store 409 using the reference value, and in step 705 constructs transport object instance (O) 757. SSC inserts into object instance 757 various object properties, including the encrypted secret (ES), the secret owner's evidence (EV) (i.e., the sending code component's evidence), and the intended recipient's evidence (REV). When the encryption/decryption algorithm requires an initialization vector (IV), the initialization vector may also be inserted as an object property. Optionally, the reference value (REF) may also be included in O (not shown). One or more of the object properties may be private object properties, such as the object properties storing evidence. O preferably has a lifespan of one. That is, once O is referred back to and the secret returned to the intended recipient the SSC will delete O. However, one of skill in the art will appreciate a variation of the invention in which O may have a lifespan greater than one.

After creating the object O, SSC passes, in step 707, to sending code component 751 a reference to O 761 (e.g., a pointer, an instance name, etc.). Subsequently, in step 709, sending code component 751 sends to receiving code component 759 the reference to O. The reference to O may be transmitted using any convenient in- or inter-process communication mechanism such as a shared memory buffer, named pipe, message queue, and the like. Because the information in O is encrypted, and because only a reference to O is being transmitted, there is no requirement that the reference to O be kept secret.

Upon receiving reference to O 761, receiving code component sends to the SSC, in step 711, a request for secret S based on reference to O 761. In step 713, SSC reads the object properties stored in O 757, and compares the intended recipient evidence (REV) 755 to the trusted caller's evidence 763, which is the trusted evidence associated with the code component that called the SSC with the reference to O (i.e., receiving code component 759). If the two pieces of evidence do not match, SSC may halt such that the calling code component, now identified as other than the intended recipient, cannot receive the decrypted secret.

If, however, the trusted caller evidence 763 matches recipient evidence 755, the SSC is assured that the receiving code component 759 is the intended recipient, and the SSC generates the decryption key in step 715. The decryption key may be generated using the internally stored owner evidence (EV) based on the principles discussed above. After generating the decryption key, the SSC decrypts secret S in step 717, and returns the decrypted secret 765 to the receiving code component 759 in step 719.

Using the above described principles, software developers of all sizes with any budget can provide Internet-scale, componentized, and/or distributed applications that safely store critical application (code component) secrets. A non-exhaustive list of types of applications that can benefit from secure storage of secrets includes middle tier Web services components that access a database backend, interacting service components communicating across a network, applications that require code components to authenticate in addition to authenticating a user, and Web cookie management applications. It should be appreciated by one of skill in the art that other types of applications may also benefit from services provided by the invention as discussed herein.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method of encrypting data, comprising steps of:
   (a) employing an algorithm within a machine to automatically compute and store an invariant entropy that is specific to the machine;
   (b) simultaneously executing a plurality of applications, which are running on behalf of an interactive user, on top of the same runtime environment within the machine;
   (c) utilizing one of the plurality of applications to request a secured data storage of data generated within the machine by the requesting application;
   (d) extracting evidence from the requesting application, the evidence being extracted by an independent component within the runtime environment, the evidence being unique to the requesting application among applications installed in the machine;
   (e) generating a cryptographic key for secured data storage in the machine based at least on the invariant machine specific entropy and the evidence; and
   (f) using the key generated in step (e) to encrypt the data generated within the machine by the requesting application in order to prevent the encrypted data from being decrypted by any other machine;
   wherein the machine specific entropy is based on at least one unpredictable event associated with hardware within the machine, and
   wherein step (e) comprises hashing the machine specific entropy directly with the evidence.

2. The method of claim 1, further comprising the step of
   (g) storing the results of step (f) in a persistent storage device.

3. The method of claim 2, wherein step (g) comprises storing the encrypted data and a reference value in the persistent storage device.

4. The method or claim 2, wherein step (g) comprises storing the encrypted data, a reference value, and an initialization vector in the persistent storage device.

5. The method of claim 1, wherein in step (a) the machine-specific entropy comprises random entropy data.

6. The method of claim 1, wherein in step (d) the evidence comprises a digital signature value computed over an in-memory run-time image of the requesting application.

7. The method of claim 6, wherein in step (d) the evidence comprises a Strong Name.

8. The method of claim 1, wherein in step (e) a SHA-1 hash algorithm is utilized to generate the key.

9. The method of claim 1, wherein in step (e) an MD-5 hash algorithm is utilized to generate the key.

10. The method of claim 1, wherein in step (f) the encryption comprises using a symmetric encryption algorithm.

11. The method of claim 1, wherein in step (f) the encryption comprises an advanced encryption standard (AES) algorithm.

12. The method of claim 1, wherein in step (f) the encryption comprises a triple data encryption standard (Triple DES) algorithm.

13. The method of claim 1, wherein the at least one unpredictable event includes a positioning of an internal hardware component of the machine, time between user manipulations of an input device of the machine, or a combination thereof.

14. A method of retrieving protected data, comprising steps of:
   (a) employing an algorithm within a machine to automatically compute and store an invariant entropy that is specific to the machine;
   (b) simultaneously executing a plurality of applications, which are running on behalf of an interactive user, on top of the same runtime environment within the machine;
   (c) utilizing one of the plurality of applications to request access to previously encrypted data;
   (d) extracting evidence from the requesting application, the evidence being extracted by an independent component within the runtime environment, the evidence being unique to the requesting application among applications installed in the machine;
   (e) generating a cryptographic key in the machine based at least on the invariant machine specific entropy and the evidence associated with the requesting application installed in the machine; and
   (f) using the key generated in step (e) to decrypt the previously encrypted data using a predefined cipher algorithm,
   wherein the predefined cipher algorithm is performed based on the invariant machine specific entropy in order to prevent the encrypted data from being decrypted by any other machine, and wherein step (e) comprises hashing the entropy directly with the evidence.

15. The method of claim 14, further comprising the step of sending the results of step (f) to the requesting application.

16. The method of claim 15, wherein the sending step is only performed when the decryption was successful.

17. The method of claim 14, wherein in step (f) the predefined cipher algorithm comprises a cipher algorithm used to encrypt the data.

18. The method of claim 14, further comprising steps of:
   (g) receiving a request from the requesting application to retrieve the data;
   (h) retrieving the evidence from an evidence provider;
   (i) securely and non-observably retrieving the machine-specific entropy; and
   (j) reading the encrypted data from a persistent storage device.

19. The method of claim 14, wherein the predefined cipher algorithm comprises a symmetric cipher algorithm.

20. A method performed in a machine for securely communicating a first application's data to a second application, the first and second applications being installed in the machine, comprising steps of:
   (a) automatically computing and storing an invariant entropy that is specific to the machine;
   (b) simultaneously executing the first and second applications, which are running on behalf of an interactive user, on top of the same runtime environment within the machine;
   (c) extracting first evidence from the first application by an independent component within the runtime environment, the first evidence being unique to the first application among applications installed in the machine;
   (d) encrypting data generated within the machine by the first application, the data being encrypted using a key based on the invariant machine-specific entropy and the evidence associated with the first application;
   (e) extracting second evidence from the second application, the second evidence being extracted by the independent component within the runtime environment, the second evidence being unique to the second application among applications installed in the machine;
   (f) creating an object comprising:
      (i) the first evidence;
      (ii) the encrypted data; and
      (iii) the second evidence;
   (g) receiving from the second application a reference to the object;
   (h) receiving third evidence from the second application; and
   (i) when the received third evidence matches the second evidence in the object, decrypting the data and sending the decrypted data to the second application,
      wherein in step (d) the key is derived by a direct hashing of the first application's evidence with the entropy.

21. The method of claim 20, further comprising steps of:
   receiving a request from the first application to create the object;
   sending to the first application the reference to the object; and
   the first application sending to the second application the reference to the object.

22. The method of claim 20, wherein in step (d) the data is encrypted using a symmetric cipher algorithm.

23. A method for generating a data structure to be stored on a computer readable storage medium in a machine, comprising:

generating a first portion of the data structure which comprises data encrypted using a symmetric cipher algorithm, based on a key generated at least from invariant machine-specific entropy and first application evidence, wherein the first application evidence corresponds to a first application, which requests the data structure's creation;

generating a second portion of the data structure which comprises the first application evidence; and generating a third portion of the data structure which comprises second application evidence corresponding to a second application, wherein
   the first and second applications, which are running on behalf of an interactive user, are simultaneously executed on top of the same runtime environment within the machine,
   the first application evidence and second application evidence are extracted from the first application and second application, respectively, by an independent component within the runtime environment,
   the first application evidence is unique to the first application among applications installed in the machine, and the second application evidence is unique to the second application among applications installed in the machine;
   the data is generated within the machine by the first application,
   the machine automatically computes and stored the machine-specific invariant entropy,
   the symmetric cipher algorithm is performed based on the invariant machine-specific entropy in order to prevent the encrypted data from being decrypted by any other machine,
   wherein the key is derived from a direct hashing of the first application evidence with the entropy.

24. The data structure of claim 23, further comprising a fourth portion comprising an initialization vector.

25. The data structure of claim 23, further comprising a fourth portion comprising a reference value.

26. A computer, comprising:
   a processor for controlling operation of the computer; and
   memory storing:
      a plurality of code components for execution on top of a runtime environment of the computer on behalf of an interactive user;
      computer-readable instructions that, when executed by the computer, cause the computer to automatically compute and store an invariant entropy specific to the computer,
      a secret store component (SSC) comprising computer readable instructions that, when executed within the runtime environment by the processor, cause the computer to perform steps of:
         (i) receiving from one of the code components a request to securely store data;
         (ii) retrieving evidence associated with the requesting code component from an evidence provider within the runtime environment, the evidence provider being independent of the plurality of code components, the evidence provider extracting the evidence from the requesting code component, the evidence being unique to the requesting code component among code components installed in the computer; and
         (iii) encrypting data received from the code component, the data being generated within the computer by the code component, wherein the encryption algorithm is based at least in part on the evidence and the computer specific entropy in order to prevent the encrypted data from being decrypted by any other computer, wherein in step (iii) the encryption algorithm uses a key derived from a direct hashing of the evidence with the computer-specific entropy.

27. The computer of claim 26, further comprising an encrypted data store, and wherein the SSC, upon completion of step (iii), performs the step of storing the encrypted data in the encrypted store.

28. The computer of claim 26, wherein in step (iii) the encryption algorithm comprises a symmetric encryption algorithm.

29. A computer-readable storage medium on which is stored instructions to be executed by a computer, said instructions comprising:

a first function which is invoked by a first function call comprising application data, wherein the first function encrypts the application data and stores the encrypted data, wherein the encryption is based at least in part on invariant machine-specific entropy and first evidence corresponding to a code component calling the first function;

a second function which is invoked by a second function call comprising a first reference to previously stored encrypted data, wherein the second function decrypts previously stored encrypted data corresponding to the first reference, wherein the decryption is based at least in part on the invariant machine-specific entropy and second evidence associated with a code component calling the second function; and a third function which is invoked by a third function call comprising a second reference to previously stored encrypted data and third evidence corresponding to an intended recipient, wherein the third function creates an object and returns a reference to the object, said object comprising:

encrypted data corresponding to a first code component calling the third function;

third evidence corresponding to a second code component intended to receive the unencrypted data, the third evidence being unique to the second code component among code components installed in the machine; and fourth evidence corresponding to the first code component, the fourth evidence being unique to the first code component among code components installed in the machine;

wherein the first and second code components are installed in a machine and simultaneously executed on top of a runtime environment, the application data is generated within the machine by the first code component, the third evidence and fourth evidence are extracted from the second code component and first code component, respectively, by an independent component within the runtime environment, and the invariant machine-specific entropy is automatically computed and stored within the machine, wherein the first function encrypts the data using a key derived from a direct hashing of the first evidence with the machine-specific entropy.

30. The computer-readable storage medium of claim 29, wherein the first function encrypts the data using a symmetric encryption algorithm.

31. A method for storing application secrets, comprising steps of:

(a) employing an algorithm in a machine to automatically compute and store an invariant entropy that is specific to the machine;

(b) simultaneously executing a plurality of applications, which are running on behalf of an interactive user, on top of the same runtime environment within the machine;

(c) receiving from one of the plurality of applications a request to store data in the machine, the data being generated within the machine by the requesting application;

(d) utilizing a trusted evidence provider within the runtime environment to extract evidence from the requesting application, the trusted evidence provider being independent of the plurality of applications, the evidence being unique to the requesting applications among applications installed in the machine;

(e) securely and non-observably retrieving the invariant machine-specific entropy;

(f) hashing the evidence directly with the entropy;

(g) encrypting the data using a symmetric cipher algorithm, wherein a key used to encrypt the data is calculated from the hashing of the evidence and entropy of step (f) in order to prevent the encrypted data from being decrypted by any other machine; and (h) storing the encrypted data in a persistent memory device in the machine.

32. A method for retrieving previously encrypted and stored data in a machine, comprising steps of:

(a) employing an algorithm in the machine to automatically compute and store an invariant entropy that is specific to the machine;

(b) simultaneously executing a plurality of applications, which are running on behalf of an interactive user, on top of the same runtime environment within the machine;

(c) receiving from one of the plurality of applications a request for previously encrypted and stored data, wherein the request comprises a reference value;

(d) utilizing a trusted evidence provider within the runtime environment to extract evidence from the requesting application, the trusted evidence provider being independent of the plurality of applications, the evidence being unique to the requesting application among applications installed in the machine;

(e) securely and non-observably retrieving the invariant machine-specific entropy;

(f) hashing the evidence directly with the entropy;

(g) reading encrypted data stored in a persistent storage device in the machine at a location corresponding to the reference value;

(h) attempting to decrypt the encrypted data using a predefined symmetric cipher algorithm, wherein a key used to attempt to decrypt the data is calculated from the hashing of the evidence and entropy of step (f); and (i) returning the results of step (h) to the requesting application;

wherein the symmetric cipher algorithm is performed based on the invariant machine-specific entropy to prevent the previously encrypted data from being decrypted by any other machine.

* * * * *